United States Patent [19]
Schroeder

[11] 3,940,675
[45] Feb. 24, 1976

[54] DIGITAL POSITIONING SYSTEM
[75] Inventor: Roger L. Schroeder, Springfield, Vt.
[73] Assignee: Bryant Grinder Corporation, Springfield, Vt.
[22] Filed: Apr. 29, 1974
[21] Appl. No.: 465,333

[52] U.S. Cl. .............. 318/603; 318/572; 318/600; 318/601
[51] Int. Cl.² .......................................... G05B 19/28
[58] Field of Search ........... 318/571, 572, 574, 600, 318/601, 602, 603, 604

[56]  References Cited
UNITED STATES PATENTS

| | | | |
|---|---|---|---|
| 3,209,222 | 9/1965 | Holy | 318/572 X |
| 3,218,532 | 11/1965 | Toscano | 318/603 X |
| 3,593,091 | 7/1971 | Ross | 318/572 |
| 3,594,563 | 7/1971 | Bishop | 318/572 X |
| 3,626,266 | 12/1971 | Sindelar et al. | 318/572 |
| 3,628,119 | 12/1971 | Abraham | 318/601 X |
| 3,665,499 | 5/1972 | Cutler | 318/571 |
| 3,795,851 | 3/1974 | Gage et al | 318/602 |
| 3,820,287 | 6/1974 | Klar et al. | 318/571 X |
| 3,840,792 | 10/1974 | Yokoe | 318/572 |

Primary Examiner—James R. Scott
Attorney, Agent, or Firm—Thomas N. Young

[57] ABSTRACT

A lateral feed position system for a single slide grinder or the like wherein a wheel spindle is displaced between a sequence of preset end points. The end points are input from decade switches as position commands and compared to a current position count in a digital comparator unit. An oscillator is energized to apply up or down count signals to the comparator depending on the result of the comparison. The same signals are applied to a stepper motor. Actual displacement signals from a shaft angle encoder are compared to the position commands to advise a sequencer that the spindle is "in position" so that the next command can be input. Means are provided to adjust the actual position counts to compensate for wheel wear. Specific circuits are disclosed.

11 Claims, 12 Drawing Figures

DIGITAL POSITIONING SYSTEM

INTRODUCTION

This invention relates to positioning systems of the feedback-comparison or closed loop type. The specific application for the positioning system described herein is the control of a digital feedmotor assembly accomplishing lateral feed in a grinding machine.

BACKGROUND OF THE INVENTION

Feedback-comparison positioning systems are well known and are commonly used in many applications. In such systems a position command is continuously and intermittently compared to an actual position signal and an error signal is generated which is related to the difference between the two. This error signal is typically applied to a feed control device such as a motor which responds in proportion to the error signal.

One application for such a system is an industrial milling or grinding machine wherein a tool must be displaced relative to a workpiece in order to perform a cutting, welding, contouring or metal working operation. In such applications the need often arises to produce a sequence of machine movements wherein the different end positions of a movable member are specified in a nonprogressive sequence; that is, one in which there is no constant arithmetic relationship between the sequence of end positions and, in fact, the member may be required to move in both forward and reverse directions to reach the commanded end positions. Moreover, there is a need for the capability for specifying a plurality of such end positions in advance of the execution of a sequence of movements; i.e., the position commands must be definable in advance. One way to accomplish this is to prepare a programming medium such as a punched tape or card in which the sequence of end positions are specified. The problem with this approach, however, lies in the difficulty of accomplishing adjustments and variations in the program.

The present invention provides a means to perform a sequence of progressive or non-progressive moves in a highly precision fashion and to permit the end points of such moves to be programmed in advance, yet remain easily changed even during actual selection of a given end point.

BRIEF SUMMARY OF THE INVENTION

In accordance with the present invention, a feedback-comparison type of positioning system is provided wherein a plurality of end position commands may be established in advance of the execution of a sequence of movements and specified in accordance with a predetermined program for causing a movable element to be sequentially moved between a plurality of end positions.

In general, this is accomplished by providing a source of pulses or pulse-like signals representing increments of movement, a motor and motor control system responsive to the pulses to move through the increments of movement represented by the number of pulses, a plurality of manually settable input devices such as multidigit thumbwheel switches, for establishing end position commands, and means for sequentially comparing the end position commands to a cumulative count of the number of pulses applied from the source to the motor. By this arrangement the pulses are applied to the motor until the currently selected end position number properly compares to the cumulative count at which time the source is effectively disconnected from the motor. In addition, signals are generated to represent actual motor displacements, a shaft angle encoder being suitable for such purposes, and the actual displacement count is continuously compared to the selected end positions such that a coincidence signal may be generated whenever the actual displacement count bears a predetermined numerical relationship to the specified end position; e.g. the two counts are equal. The coincidence signal may of course be used to trigger the advance of the sequence whereby the next end position command is entered.

A further feature of the present invention is the means by which the cumulative count may be adjusted such as by partial reduction after a condition of equality; i.e., position coincidence, has been attained. Thereafter, the system determines itself to be out of position and automatically advances until the condition of equality has been restored. In this fashion minor adjustments and compensations for physical variations such as tool wear may be accomplished.

One example of the application of a compensation feature as described immediately above arises in the case of a machining or grinding operation wherein the feed position of a wheel spindle must be intermittently adjusted and compensated to correct for radial wheel wear and the reduction in wheel size which is produced by a dressing operation.

A further feature of the invention is the means for maintaining not only a compensated feed progress count for generation of the coincidence signal as described above but also an uncompensated or absolute feed position signal for comparison to an absolute position quantity so as to generate a second coincidence signal based on absolute displacement of the wheel spindle, for example, in a grinding machine. In this fashion, the detection of a worn wheel may be facilitated.

Further features and advantages of the present invention will become apparent from a reading of the following specification which is to be taken in conjunction with the accompanying drawings.

DETAILED DESCRIPTION OF THE SPECIFIC EMBODIMENT

System Block Diagram

Figure 1:
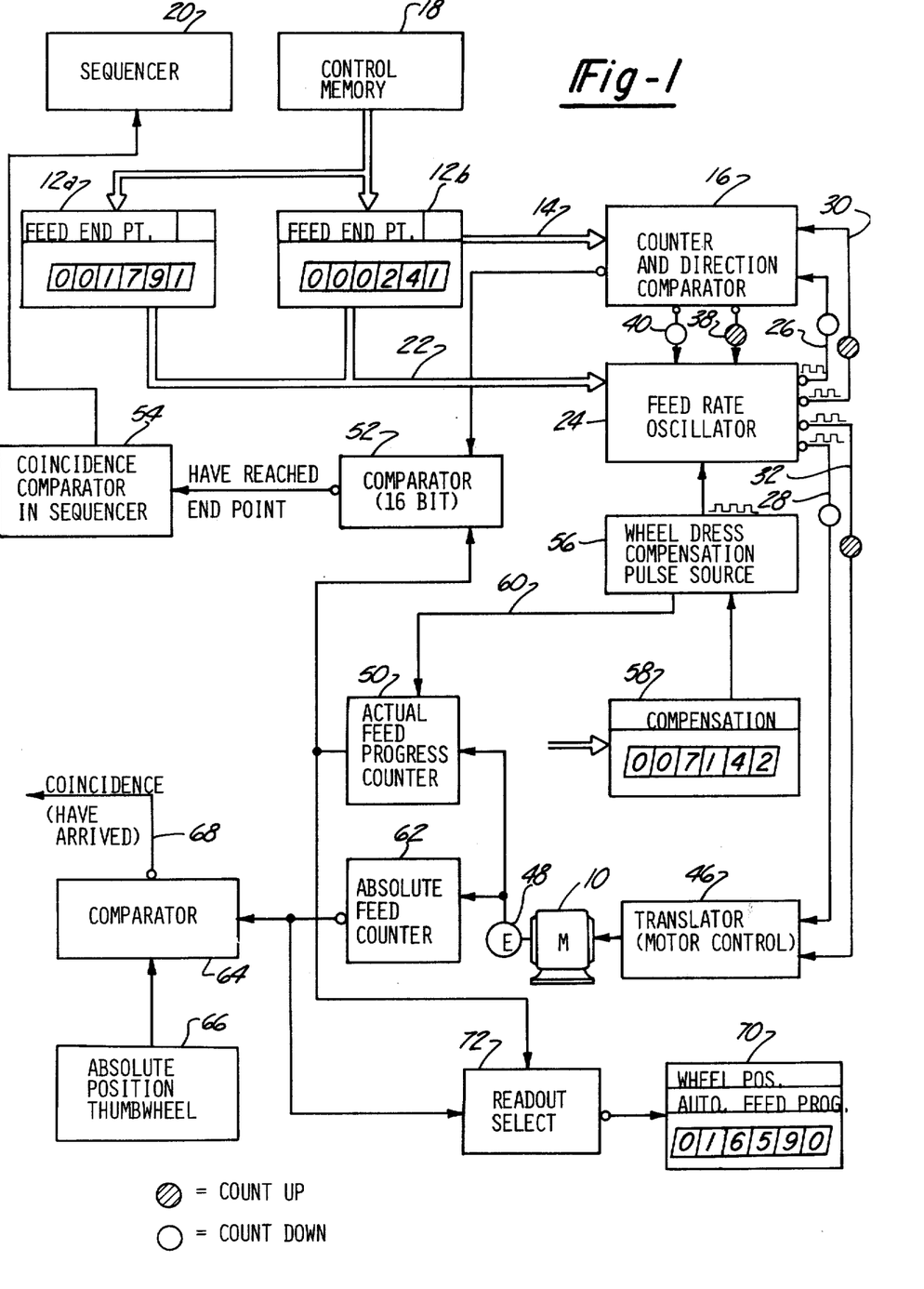
FIG. 1 is a block diagram of a digital positioning system organized and constructed in accordance with the invention.

Referring to FIG. 1, in the system block diagram the positioning system comprises as a prime mover the stepper motor 10 which is responsive to pulses to move an output shaft through discrete increments. The position commands to which the system responds are entered or input into the system through a plurality of identical six-digit thumbwheel switches 12a and 12b, it being understood that in the typical system six or more of such switches will be provided. Thumbwheel switches 12a and 12b each comprise six manually settable decade wheels for specifying a feed end point in the decimal number system. The thumbwheel switches 12a and 12b are connected by way of a 60-bit position input line 14 to the left side of a counter and direction comparator unit 16 which functions to compare the position command with a cumulative count representing the present position of the motor 10 or the output member which is displaced by the motor 10. The feed end point information from the thumbwheel switches 12a and 12b is individually and selectively input to the unit 16 according to a sequence of selection codes which are applied to the switches by a control memory 18 which functions under the control of a system sequencer 20.

In brief, the sequencer 20, when advised that the last current instruction has been carried out, increments the input to the control memory 18 so as to select the next instruction or, in this case, feed end point for input to the stepper motor system comprising motor 10 and unit 16. The feed end point represented by the digits of switch 12a may be input first and after the system has reached the position represented by that feed end point, the information from switch 12b may thereafter be input. It is to be noted that the feed end point information is input one switch at a time and creates a dynamic relationship between the selected thumbwheel switch 12 and the positioning system during the entire input interval related to that switch. In other words, it is possible to dynamically change the specified feed end point by changing one of the digits on the thumbwheel switch sets during the input interval and the positioning system will respond to that change by altering the position of the output member connected to motor 10. The sequence may be non-progressive; i.e. non-numeric and may be varied from sequence to sequence as well as within a given sequence.

Switch sets 12a and 12b are settable not only to command position but also to command the rate at which the system is to travel to the end position. This information is conveyed by way of 6-bit line 22 to a feedrate oscillator 24, a source of digital pulses representing increments of movement. The feedrate oscillator 24 has output lines 26 and 30 connected to the counter and direction comparator unit 16, line 26 being identified in the drawing as the line which carries "countdown" pulses, i.e. pulses which reduce the count stored in the right-hand side of the counter and direction comparator unit 16. Line 30 carries the "countup" pulses; that is, the pulses which increase the count in the righthand side of the comparator 16. As hereinafter described, the comparator portion of the unit 16 compares the lefthand count or position command count to the righthand count or cumulative position count and produces an "enable" signal on either line 38 or 40 depending on whether an increase or decrease in the cumulative total count is necessary to produce equality. In this fashion, the oscillator 24 is actuated upon each new selection of a switch set 12 for input to the left side of unit 16 so as to equalize the left and righthand counts in the unit 16. If at any time after equalization has been achieved but before the next switch set 12 is selected, the currently selected switch set is changed, the condition of equality is disturbed and the oscillator 26 is again actuated in such a direction as to bring the two counts into equality.

Oscillator 24 is also provided with output lines 28 and 32 which apply countdown and countup pulses to the motor 10 through the digital pulse translator 46. Pulses applied by way of line 28 cause the motor output shaft to rotate in one direction whereas pulses applied by way of line 32 cause the output shaft to rotate in the other direction. It will be clear that the countup and countdown terms may be arbitrarily applied to opposite direction of motor movement. The translator 46 is a commercial available unit for responding to digital pulses to rotate the stepper motor by a predetermined angular increment. A suitable translator is available from Superior Electric Company of Bristol, Conn. and is identified by Model No. BTR-103.

The output shaft of motor 10 is equipped with a shaft angle encoder 48 which is a well known prior art device to produce digital pulses for predetermined increments of shaft rotation. In this case the increments of shaft rotation represented by the pulses of encoder 48 are the same as the increments of rotation represented by the pulses applied to the motor 10. Accordingly, the pulses from encoder 48 represent actual motor displacement or output member displacement. These pulses are applied to the feed progress counter 50 to produce a current count which is representative of the net displacement of the motor. The output of counter 50 is applied to one input of a sixteen bit comparator 52. The other input to the comparator 52 is received from the lefthand side of the counter and direction comparator unit 16 and thus represents the currently input position command. Whenever the actual position count represented by the contents of counter 50 is equal to the actual position command the comparator 52 produces an output signal representing coincidence between the two counts. This is applied to a coincidence comparator unit 54 which in turn produces an output which is applied to the sequencer 20 to advance the preprogrammed sequence to the next step. The next step may be the selection of a second feed end point or such other function as may be designated in the program at that time.

The positioning system of FIG. 1 comprises a secondary pulse source 56 which is connected to the feedrate oscillator 24 to apply a small number of countdown pulses to the righthand counter in comparator unit 16 in accordance with the setting of the thumbwheel switch 58 whenever that switch is enabled by the control memory 18 to input its contents to the pulse source 56. The pulses applied to oscillator 24 to countdown the unit 16 are also applied by way of line 60 to the counter 50 so as to count back the contents of the counter by the same number of pulses as are applied to count back the unit 16. It will be noted that the compensation pulse count is not applied to the motor 10 by way of translator 46 and accordingly no back-up motor travel occurs during the countback of unit 16 and counter 50. The result is the forced creation of a dynamic instability which results in a condition of inequality in the unit 16 and the immediate energization of output line 38. Pulses are then applied by way of outputs 30 and 32 to the units 16 and 46 to advance the count in the righthand side of the unit 16 and to advance the motor 10 so as to add pulses into the counter 50 until equality is once again restored.

Thus, counting back unit 16 and 50 by the forced inequality produced through the compensation pulse source results in an advance of the motor beyond the actual feed end point specified by input switch 12. This is often desirable in a metal working tool where a grinder wheel or the like is dressed after a predetermined number of cutting or grinding operations. The result of a dressing operation, as is well known to those skilled in the art, is a reduction in the physical radius of the grinding wheel. Thus, to produce a metal working contact between the new peripheral surface of the grinding wheel and the normally stationary part, a compensating movement of the wheel spindle must be effected. It is by way of the wheel dress compensation pulse source that such compensation is effected within the positioning system of the present invention.

From the foregoing it can be seen that the actual feed progress counter 50 and the comparator 52 are effective to maintain a running comparison between the command position and the actual position taking compensation into account. However, it is also desirable to maintain a running indication of the position of the wheel spindle centerline relative to an absolute position reference thereby to monitor wheel position within limits of travel and, in many cases, to indicate a condition of wear which calls for the installation of a new wheel. To accomplish this the encoder output pulses are applied to an absolute feed counter 62 to increment the count in accordance with the position of rotation of the shaft which drives the encoder 48. The number in counter 62 is applied to one input of a comparator 64. The other input to comparator 64 is received from an absolute position thumbwheel switch set 66 which is a multidigit resettable input device similar to the feed end point thumbwheel switches 12 and the compensation thumbwheel switch 58. Absolute position thumbwheel switch set 66 is in constant input relationship to the comparator 64 and need not be actuated by the sequencer 20 at some specific point in the program. The comparison between the count in the absolute feed counter and the absolute position thumbwheel 66 in comparator 64 is such as to produce a coincidence output signal on line 68 whenever the counts are equal. It will be noted that the absolute feed counter 62 is totally independent of the wheel dress compensation pulse source 56 and thus is not counted back along with counter 50 whenever a compensation operation is carried out.

The system of FIG. 1 is provided with a wheel position indicator 70 typically in the form of a multidigit decimal display driven by binary input signals. The actual feed progress counter 50 is connected to the wheel position indicator unit 70 along with the output of the absolute feed counter 62. Both of the counters 50 and 62 are connected to the indicator 70 through a selector switch 72 so that either of the two position counts may be displayed to an operator at any time Lateral Feed System — Mechanical Details Referring to FIGS. 2 through 4, the implementation of a lateral feed positioning system in a single slide grinder machine will be described as a specific application of the system shown in FIG. 1. The portion of the machine shown includes a slide assembly for moving the grinding wheel axially to the workpiece and a lateral feed assembly for moving the wheel in the lateral direction.

Figure 2:
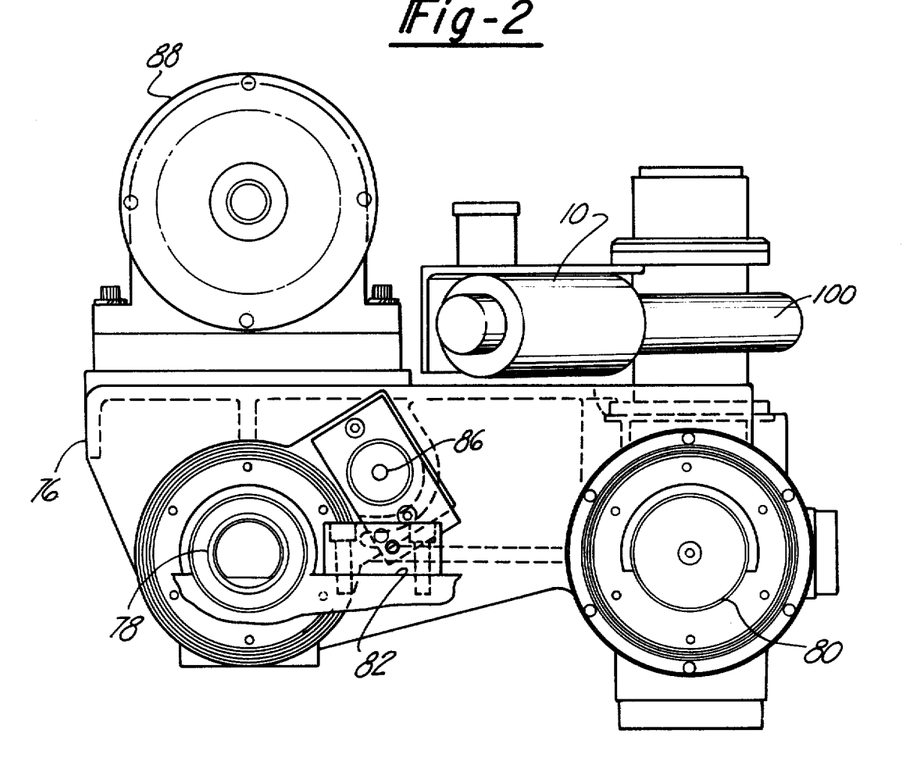
FIG. 2 is an end view of a single slide grinding machine employing the present invention to control lateral wheelhead displacement.
Figure 3:
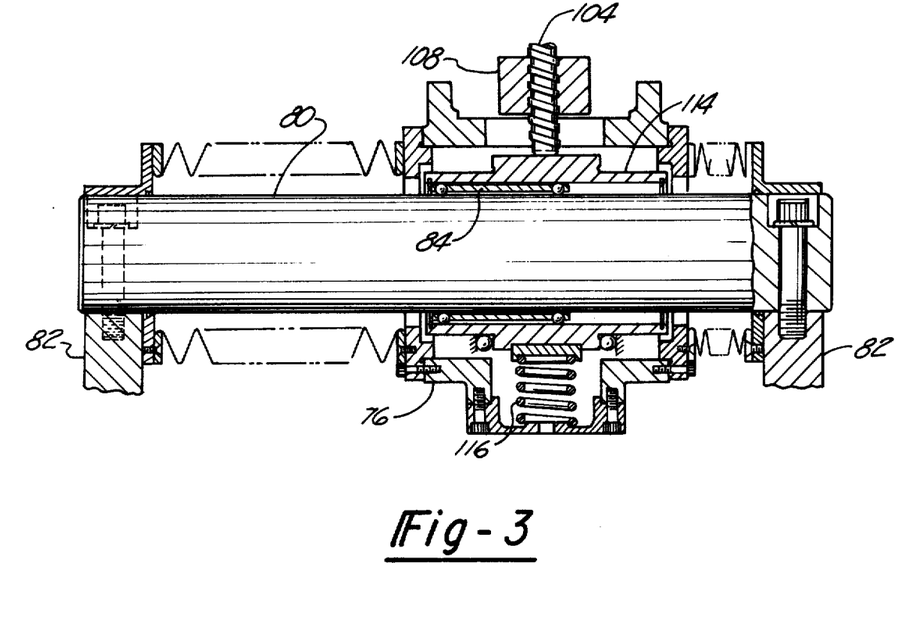
FIG. 3 is a side view in cross section of a slidebar assembly and part of the feedmotor system controlled by the block diagram of FIG. 1.

In FIGS. 2 through 5, a heavy rigid wheelslide housing 76 is mounted for longitudinal displacement over spaced parallel rigid slidebars 78 and 80 which are firmly and non-rotatively mounted on a grinder base 82, only a portion of which is illustrated in FIGS. 2 and 3. The wheelslide housing 76 is supported on slidebar 78 by means of two axially spaced bearings (not shown) and on slidebar 80 by means of a single set of bearings 84 so as to permit the housing 76 to be longitudinally displaced through controlled distances over the slidebars 78 and 80. Such displacement is controlled by means forming no part of the present invention; an example is a rod 86 connected to the housing 76 on one end and to a pivotal lever on the other end. The lever in turn is biased against a programming cam which pivots the lever arm and longitudinally displaces the housing 76 over the slidebars 78 and 80. The details of such a system are set forth more fully in the copending application Ser. No. 464,917 filed Apr. 29, 1974, in the name of Hugh T. Edgar and John Lovely concurrently herewith.

Figures 4, 5:
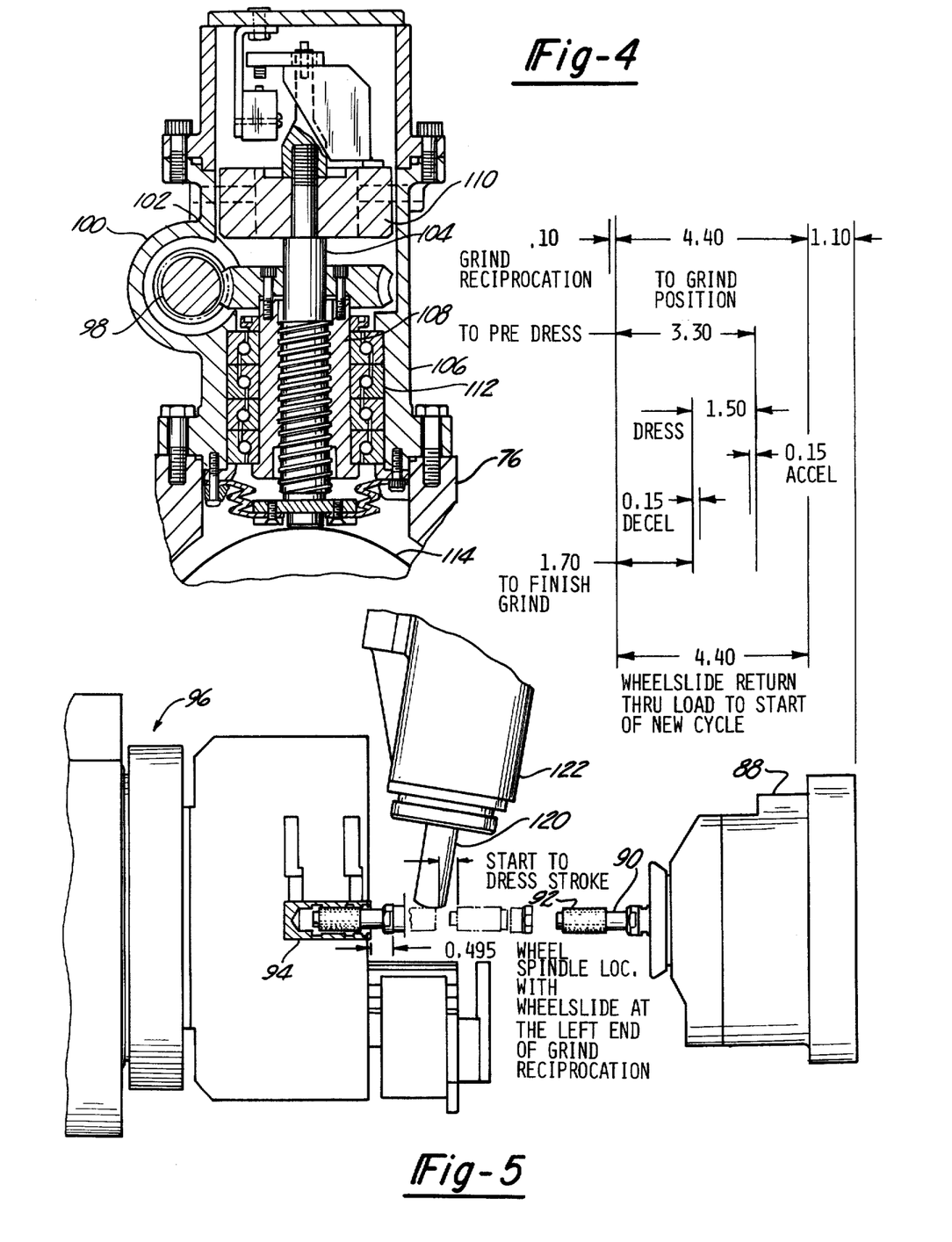
FIG. 4 is a sectional view of the mechanical components of the lateral feed system.
FIG. 5 is a diagrammatic view of a grinder wheelhead workhead and dresser assembly.

The wheelslide housing 76 carries a wheelhead assembly 88 comprising a motor and wheel spindle 90 (FIG. 5). The spindle 90 in turn carries a grinding wheel 92 which is used to internally grind valve lifter bodies 94 held in a stationary position in a workhead assembly 96. The workhead assembly 96 is fixedly mounted on the base 82 such that longitudinal wheelslide housing displacements longitudinally move the grinder wheel 92 relative to the parts 94 being ground.

The motor 10 first referred to in the circuit of FIG. 1 is carried by the wheelslide housing 76 as illustrated in FIG. 2. Looking to FIGS. 2 through 4, the motor 10 is directly connected to an output member in the form of a worm shaft 98 which is disposed within the shaft housing 100. Shaft 98 meshes with the periphery of a worm gear 102 which is disposed about a shaft 104, both gear 102 and shaft 104 being concentrically disposed within a feed case assembly including a housing 106 which is mounted by means of machine screws on the wheelslide housing 76. Shaft 104 and gear 102 are concentrically disposed within the housing 106 and the entire assembly is substantially coaxial with a radius of the rear slidebar 80. Gear 102 is connected by way of machine screws to a nut 108 which is in threaded engagement with a lower end portion of shaft 104 such that rotation of the worm shaft 98 by the motor 10 causes rotation of the gear 102 and the nut 108 to which it is connected. Shaft 104 is held by key 110 against rotation relative to the housing 106. Accordingly, rotation of the nut 108 produces relative travel between the nut and the shaft 104 for purposes hereinafter described.

Nut 108 is rotatably mounted relative to the housing 106 by means of Quadraplex bearings 112. The lower end of shaft 104 bears directly against a sleeve 114 which is mounted on the bearing assembly 84. A spring 116 is disposed between the lower inner surface of the housing 76 and the sleeve 114 to provide a resilient interconnection between the wheelslide housing 76 and the slidebar 78.

From the foregoing it can be seen that the wheelslide housing 76 is radially movably relative to the rear slidebar 80, such movement being accomplished by rotation of the nut 108 on the shaft 104. The displacement is not purely radial since it is centered about the centerline of front slidebar 78. The displacement of the housing 76 relative to the rear slidebar 80 produces a lateral displacement of the wheelhead 88 with a consequential lateral displacement of grinder wheel 92 relative to the interior surface of the valve lifter body 94 which is being ground.

OPERATION

Referring now to FIGS. 1 through 5 a typical operation of the circuit and apparatus set forth above will be described.

A typical internal grinding operation involves (a) initial wheel dress, (b) rough grind, (c) subsequent wheel dress, and (d) finish grind. All of these operations are associated with predetermined lateral wheel positions which are specified by means of the thumbwheel switch sets 12a, 12b and so forth. The initial dress position is determined by the nominal initial radius of the grinder wheel 92 and the position of a diamond dresser 120 which is carried on the workhead assembly 96 and which is driven by a rotary dresser motor 122. The lateral position of the diamond dresser 120 is fixed when in the operating position and accordingly the wheel 92 must be laterally positioned to effect a first initial dress operation with a resulting predetermined grinder radius. Following the initial dress a rough grind or "spark-out" process is made with the wheel 92 longitudinally displaced into the interior of the valve lifter body 94 as indicated in FIG. 5. The wheel must be subsequently dressed after the spark-out operation with a further lateral displacement being required to accomplish such dress. The finish grind is then carried out at a predetermined lateral position and the sequence may be repeated.

Clearly, the sequencer 20 and the control memory 18 individually select the feed end points from the thumbwheel switch sets 12a and 12b for application to the left side of the counter and direction comparator unit 16. For each number applied to the left side of unit 16, a comparison is made with the current total of displacement increment pulses generated by the feedrate oscillator 24, the cumulative total representing the total number of countup pulses less the total number of countdown pulses and being measured from a given reference position. The selected feed end point, or the count representing such end point, is applied to one input of comparator 52 and the total number of actual displacement pulses generated by the encoder 48 and the counter 50 is entered into the other input of comparator 52. In practice, equality between the two inputs to comparator unit 16 occurs at the same time as equality occurs between the two inputs to comparator 52. When equality occurs at comparator 52, an output is generated by the coincidence comparator 54 and the sequencer 20 advances to the next feed end point command or to such other instructions as may be involved in a given program.

After the rough grind, for example, the dress operation is initiated by moving the dresser 120 into position and laterally displacing the wheelhead 88 through a displacement which represents the reduction in wheel diameter which is to be effected by the dress stroke. The lateral dress displacement is entered by the compensation thumbwheel switch 58 and the wheel dress compensation pulse source to count back the righthand count in comparator unit 16 as well as the actual feed count in counter 50. Inequality then exists in both units 16 and 52 and the oscillator 24 is energized to restore equality. This has the effect of placing the system back into equilibrium so as to indicate that the command position has been reached when in actuality the wheel spindle centerline has been displaced from the position it occupied when the current command was first entered, the increment of displacement being equal to the reduction in diameter of the grinder wheel 92.

Whenever a sufficient number of compensation pulses have been entered, a worn wheel condition is to be signified so as to permit the grinder wheel 92 to be replaced. This is indicated by the comparison between the contents of the absolute feed counter 62 and the absolute position thumbwheel 66, this comparison being carried out in the comparator 64. It will be noted that the absolute feed position counter is not connected to receive the compensation pulses from source 56 and accordingly counter 62 maintains an actual absolute position indication related to the centerline of the spindle 90 rather than the peripheral surface of the wheel 92. Either the actual feed count from compensated counter 50 or the absolute feed count from uncompensated counter 62 may be displayed by means of switch 72 and digital display unit 70.

DETAILED CIRCUIT DESCRIPTION

Referring now to FIGS. 6 through 12 the details of the specific circuitry for implementing certain portions of the circuit of FIG. 1 will be described.

Figure 6:
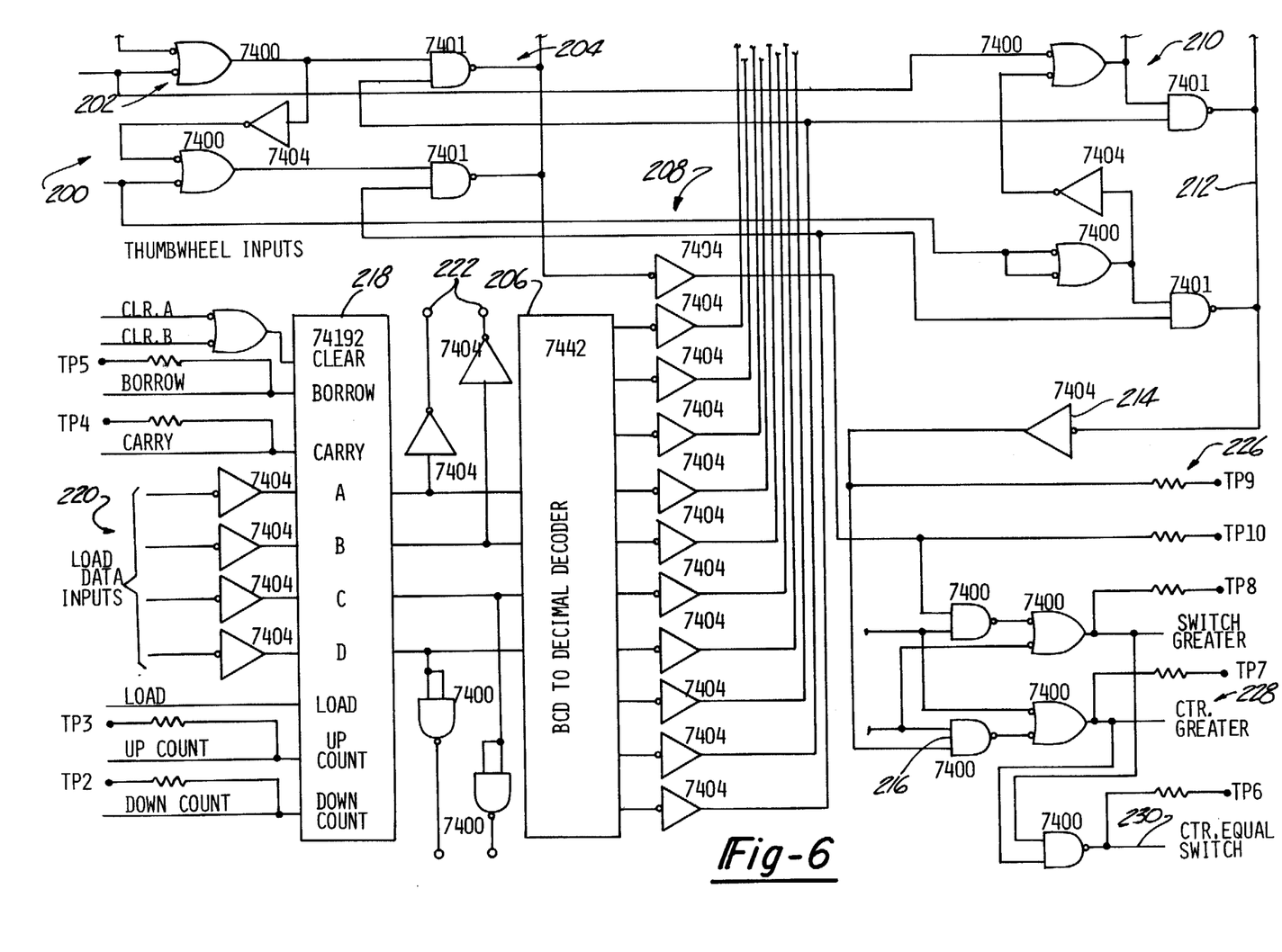
FIG. 6 is a detailed schematic diagram of a comparator in the block diagram of FIG. 1.

FIG. 6 is a schematic circuit diagram of a representative portion of a direction counter and comparator unit 16 from the block diagram of FIG. 1. The circuit of FIG. 6 comprises ten input terminals 200 representing the ten possible decimal positions of a single decade wheel on a thumbwheel switch set such as 12a. Only two of the ten are shown in the drawing. It is to be understood that the circuit of FIG. 6 is duplicated for each decade of multidigit thumbwheel switch set. The ten input terminals 200 are each connected to one input of a NOR gate 202, the other input of each NOR gate being the inverted output of the previous NOR gate in the input series. The outputs of the NOR gates 202 are connected to one input of the NAND gates 204, the other inputs to each of the NAND gates being taken from a BCD to decimal decoder 206 through inverters 208. The output of the currently actuated NAND gate is connected through the logical gate combination 210 to which it is connected and thence applied by way of line 212 and inverter 214 to the input of NAND gate 216 where a logical function is performed. The circuit of FIG. 6 further comprises an up-down counter 218 which receives clear signals, borrow signals, carry signals, load data input signals, up-count signals, down-count signals by way of input terminals 220. The output of the up-down counter 218 is connected to the BCD to decimal decoder 206 and also by way of outputs 222 to the logical gate network 226 to assist in determining whether the switch position command is greater than the count or whether the current count is greater than the switch position command. The outputs appear on terminals 228 when inequality exists and on terminal 230 when equality exists.

The circuit component designator numbers as well as standard logic circuit symbols are used in the circuit of FIG. 6 so as to permit an electronics engineer or technician of ordinary skill in the art to implement the unit 16 by a straightforward selection and interconnection of commercially available components.

Figure 7:
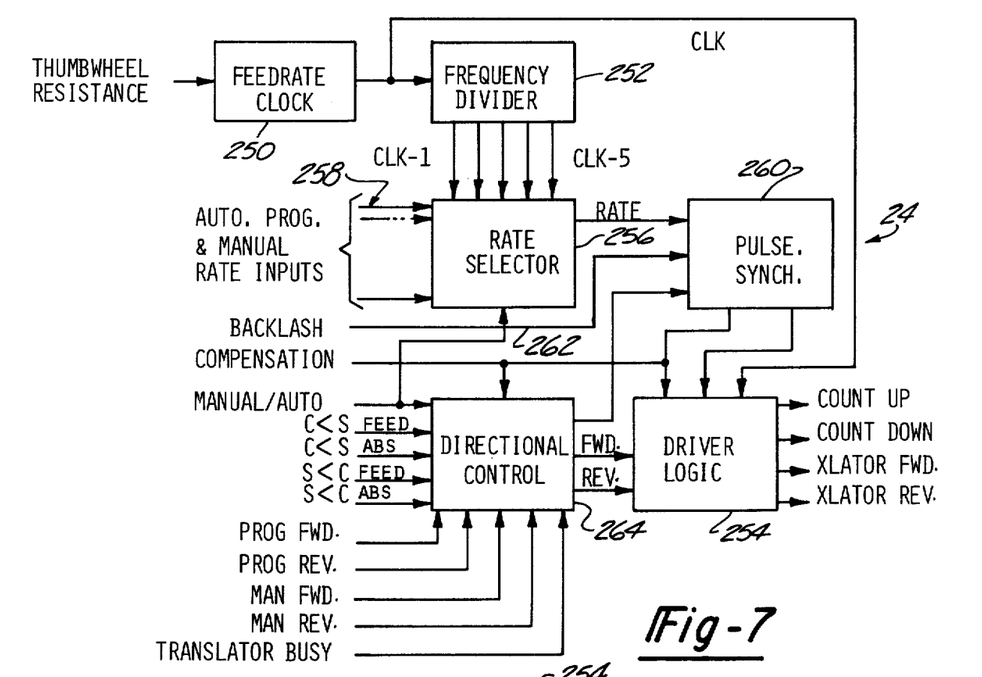
FIG. 7 is a block diagram of a feedrate and direction control system employed in the overall system of FIG. 1.
Figure 8:
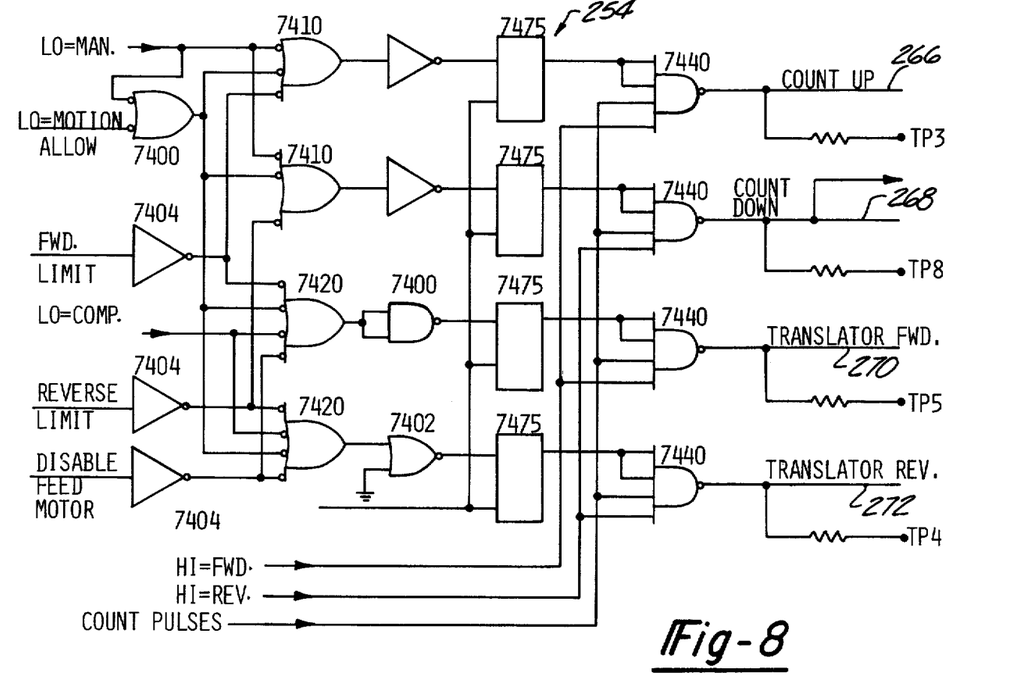
FIG. 8 is a schematic circuit diagram of the driver logic circuit in the block diagram of FIG. 7.

Referring now to FIG. 7 the block diagram of the feedrate oscillator 24 and the functional interrelationship thereof with the unit 16 is shown in block diagram. The block diagram of FIG. 7 may be taken in combination with the detailed schematic diagrams of FIGS. 8, 9, 10, 11, and 12 hereinafter described. In FIG. 7 the unit 24 is shown to comprise a feedrate closk 250 having the output thereof connected to the frequency divider 252 and the driver logic circuit 254, the details of which are represented in FIG. 8. The four outputs of the frequency divider 252 are connected to the rate selector 256. The inputs 258 to the rate selector 256 include automatic programmed and manual rate inputs to select one of the frequencies which are provided by the standard frequency divider 252. The rate signal is applied from the rate selector 256 to the pulse synchronizing circuit 260 along with a backlash signal on line 262 and a signal from the directional control unit 264. The directional control unit receives as feed signals information as to whether the switch signal (S) is greater than the current count (C). Similar signals are received with respect to the absolute position count. A fifth signal is received from the control panel as to whether manual or automatic operation is contemplated. The other five inputs to the directional control unit 264 include the forward and reverse signals for both programmed and manual operation and a "translator busy" signal. The output of the directional control unit 264 is either a forward or reverse signal and is applied to the driver logic circuit 254 to determine whether a countup or countdown signal shall be applied to the unit 16 and whether forward or reverse signals shall be applied to the translator unit for motor 10.

FIG. 8 is a schematic circuit diagram again using standard logic symbols and industry standard circuit numbers to facilitate construction thereof from commercially available components. The specific implementation of FIG. 8 is for the driver logic unit 254 in the block diagram of FIG. 7. The inputs on the left side of circuit 254 are of a binary character; i.e. either high or low, and are connected through the indicated logic gates to the flip-flops and output gates. The output gates provide the countup, countdown, forward, and reverse signals on outputs 266, 268, 270 and 272 respectively.

Figure 9:
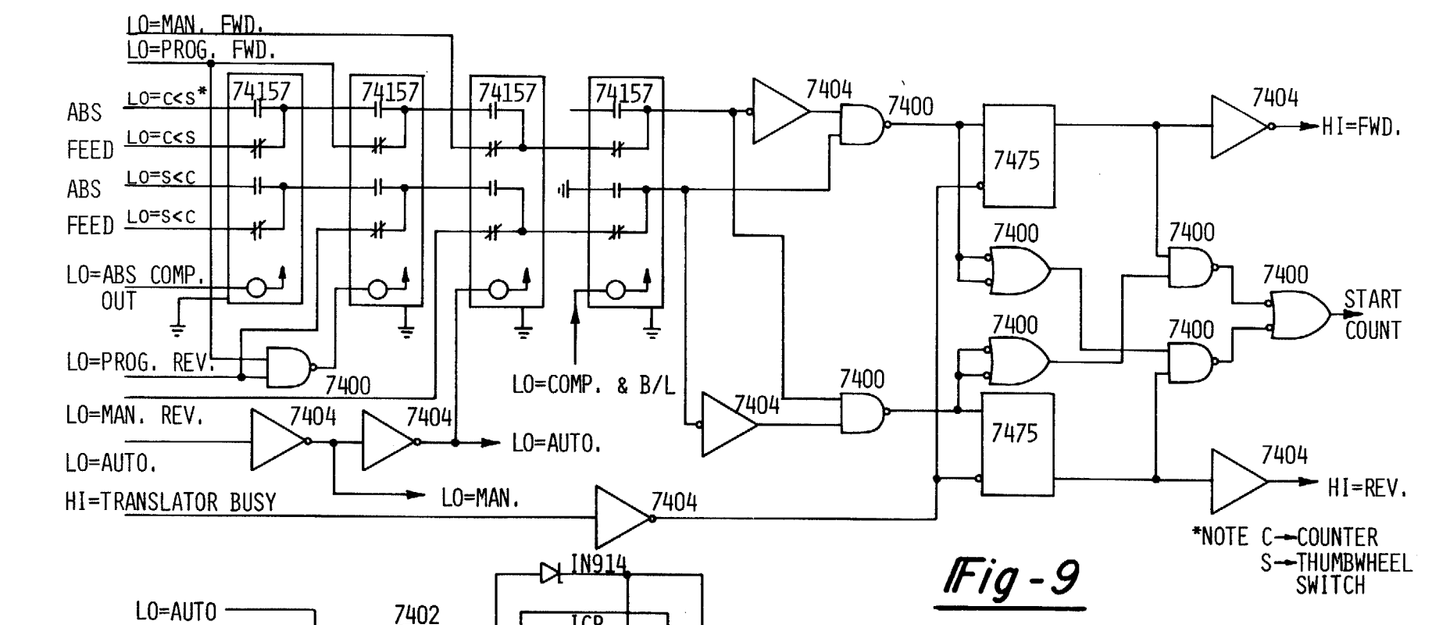
FIG. 9 is a schematic circuit diagram of the directional control circuit in the system of FIG. 7.

FIG. 9 illustrates the schematic-logic details of the direction control unit 264 of FIG. 7; i.e. that circuit which determines whether a countup (FWD) or countdown (REV) signal is high at the time the count is started.

Figure 10:
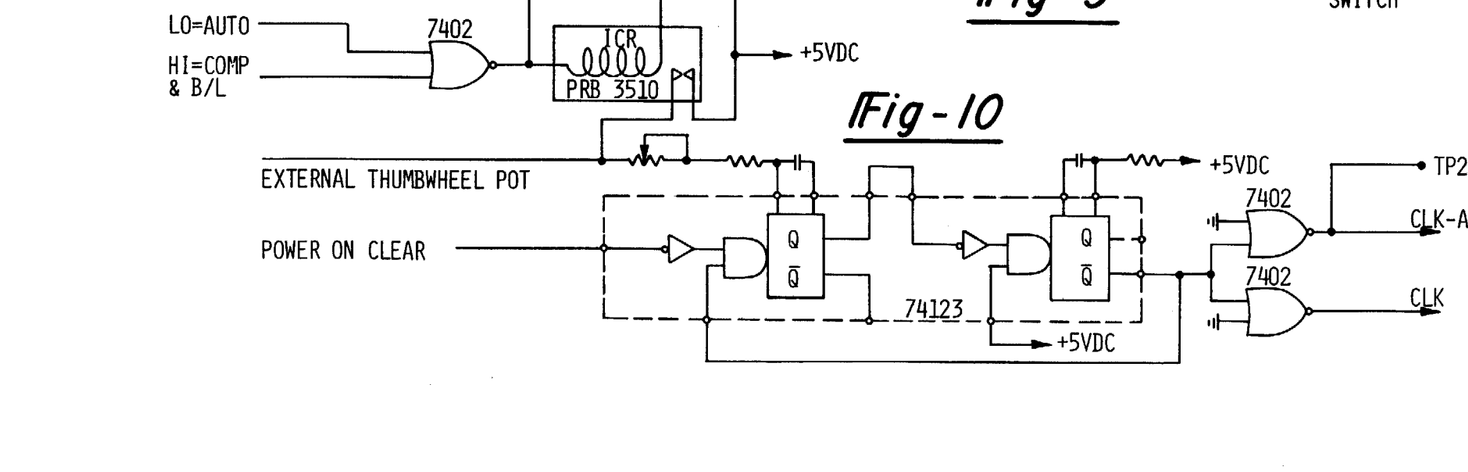
FIG. 10 is a schematic-logic diagram of the feedrate clock in FIG. 7.

Looking now to FIG. 10 the details of a feedrate clock circuit 250 are given again for the purpose of facilitating implementation. Again, standard logic diagram symbols and industry circuit designated numbers are used and a detailed description of the implementation and operation of the circuit of FIG. 10 will be omitted as obvious to persons of ordinary skill in the electronics art.

Figure 11:
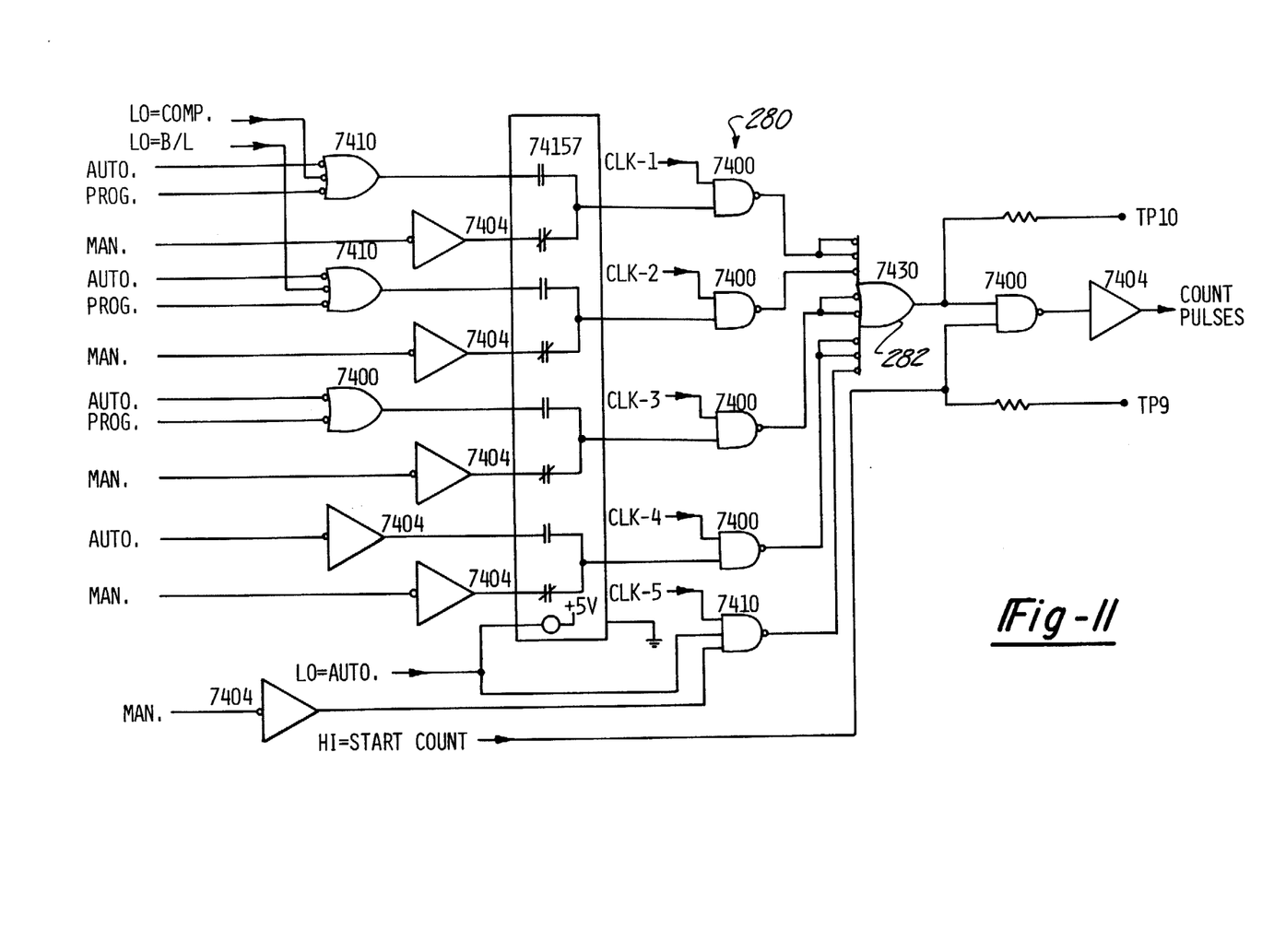
FIG. 11 is a schematic-logic diagram of the rate selector in FIG. 7.

FIG. 11 is a schematic circuit diagram of the rate selector unit 256 in the block diagram of FIG. 7 and is designed for use in combination with a standard flip-flop type frequency divider which provides the CLK-1, CLK-2, CLK-3, CLK-4, and CLK-5 signals at the pulse frequencies which are related to one another by the decade units of the standard frequency divider. The input sets are applied to inverting OR gates and inverters, the outputs of the OR gates and inverters being connected through normally opened and normally closed contacts to the inputs of NAND gates 280. The outputs of the gates 280 are logically ORed together into a single gate 282 the output of which represents the selected rate for application to the pulse synchronizing unit 260.

Figure 12:
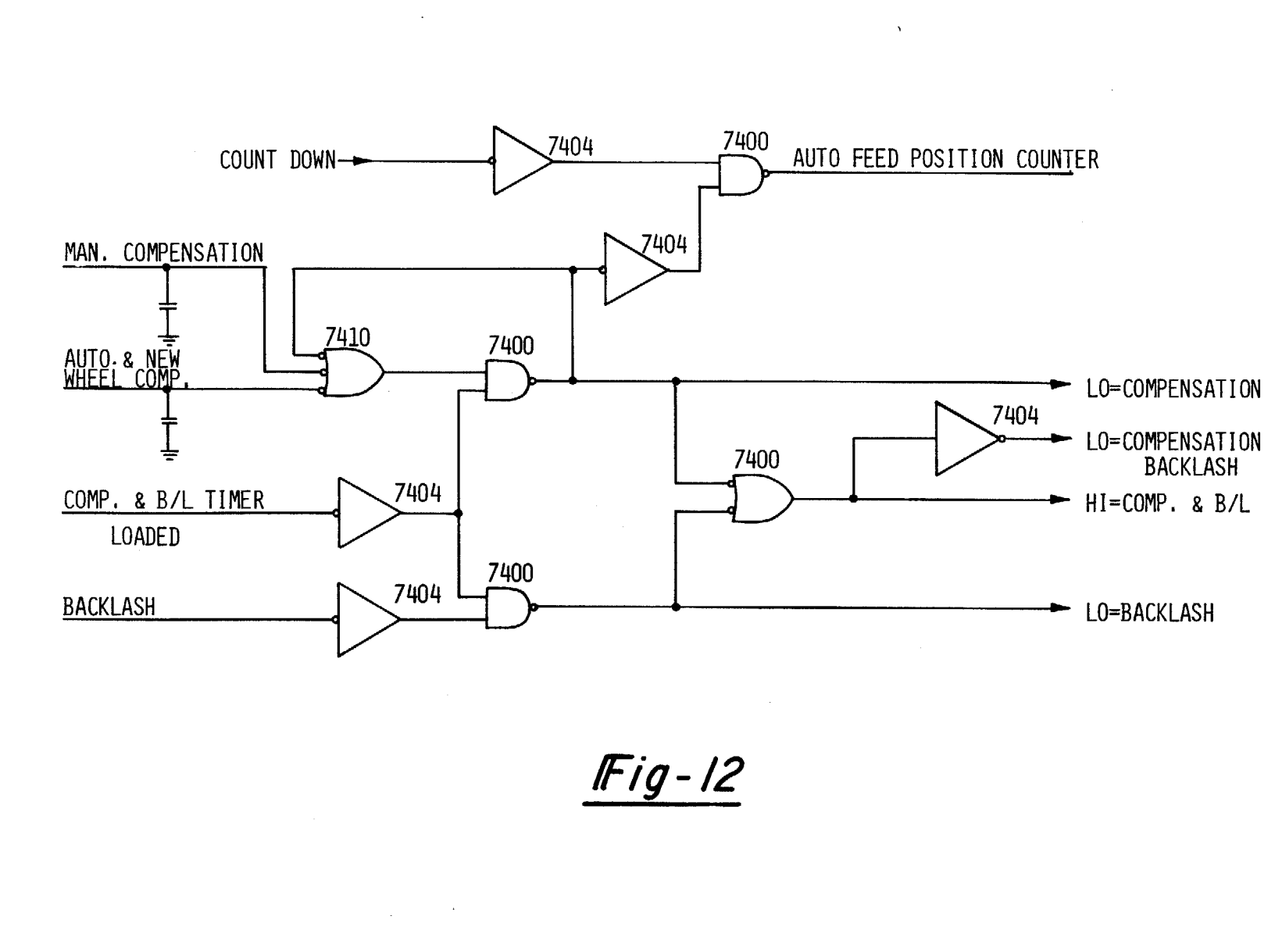
FIG. 12 is a schematic-logic diagram of the compensation and backlash logic circuit in FIG. 7.

FIG. 12 is a detailed schematic circuit diagram of a compensation and backlash logic circuit which is used to provide the backlash and compensation inputs identified in the system block diagram of FIG. 7. The five inputs to the circuit of FIG. 11 are identified in the drawing along with the five outputs. Again, standard circuit symbols and numbers are used to facilitate implementation.

It will be understood that the specific circuit diagrams that are given herein are merely illustrative of one implementation of the invention and are not to be construed in a limiting sense as various modifications and alternatives will occur to those skilled in the circuit synthesis arts. Likewise, the application of the invention to lateral feed control in a single-slide grinder is not intended as a limitation on the invention as sequential position control operations to which the present invention may be applied are many and varied.

What is claimed is:

1. A digital positioning system comprising: a bidirectional motor responsive to first pulses to move an output member through discrete increments; a source of digital pulses representing said increments said source having an add pulse output representing displacements in one direction and a substract pulse output representing displacements in the other direction; a plurality of individually settable input means for designating a plurality of sequentially selectable desired end positions of said output member, means for producing second pulses representing increments and direction of actual displacement thereof; first comparator means connected to the add and subtract pulse outputs and to the input means for sequentially comparing a net cumulative count of add and subtract pulses applied by the source to the motor with selected end position counts and controlling the flow of pulses from the source to equalize the net count with the selected end position count; and second comparator means for individually comparing the selected end position counts with actual pulse counts from the encoder to determine when the output member reaches the selected end position.

2. Digital positioning system as defined in claim 1 further including: a compensation pulse count source, means for selectively adjusting the net cumulative count and actual count by said compensation count after equalization thereof whereby additional pulses are caused to flow to said motor and first and second comparator means to re-equalize said counts.

3. Digital positioning system as defined in claim 2 further including third comparator means for comparing the count from a predetermined one of said input means to the actual pulse count, said third comparator means being independent of said compensation count so as to maintain said comparison on an absolute basis.

4. Digital positioning system as defined in claim 3 including count display means, and selector means for alternatively connecting the compensated and uncompensated pulse counts to the display means.

5. Digital positioning system as defined in claim 1 including a wheelslide assembly for receiving a metal working tool connected to said output member to be laterally displaced thereby relative to a work station.

6. Digital positioning system as defined in claim 5 including a dresser for reducing the lateral dimension of said tool, a source of compensation pulse counts representing the desired lateral dimension reduction, means for selectively adjusting the current count and actual count by said compensation count after equalization thereof whereby additional pulses are caused to flow to said motor and first and second comparator means to re-equalize said counts.

7. Digital positioning system as defined in claim 6 wherein the wheelslide assembly comprises first and second spaced slidebars, a slide mounted on the bars for longitudinal displacement thereover, a feed screw nonrotatably connected to the slide and mechanically bearing on one of the bars, a nut on the shaft and secured to the slide for movement therewith, the motor being connected to turn the nut on the screw thereby to angularly displace the slide relative to the one bar and about the centerline of the other bar.

8. Digital positioning system as defined in claim 1 wherein said input means are multidigit thumbwheel switches.

9. Digital positioning system as defined in claim 1 including sequencer means for selecting said input means for comparison of the end position counts represented thereby in a sequence, means connected to said second comparator means for generating a coincidence output signal when the output member reaches the selected end position, said sequencer being connected to receive the coincidence output signal and responsive thereto to advance the sequence by selecting another of said input means for input relation to said first comparator means.

10. In a digital positioning system of the type having a bidirectional motor responsive to first and second pulse trains to move incrementally in opposite directions: a plurality of individually settable switches for selecting counts representing end positions to be achieved by said motor in a predetermined sequence; a control memory separate from said switches and programmed to establish said sequence, said control memory being operatively connected to the switches to select the switches for input conditioning as said sequence is advanced; counter/comparator means for compiling a count representing the net position change of said motor and for comparing said count to the end position count of the switch selected for input conditioning at any given time and for producing an output representing the magnitude and sense of difference therebetween; means connected to said counter/comparator means and responsive to the output therefrom to selectively apply first and second pulse trains to the motor until the counts coincide; and means responsive to a coincidence of said counts to advance said sequence.

11. Apparatus as defined in claim 10 further including a perishable tool connected to be displaced by said motor, and means independent of said input means for selectively altering said net count to compensate for variations in the effective size of said perishable tool over the operating lifetime thereof.

* * * * *